US 6,630,941 B1

(12) United States Patent
Addison

(10) Patent No.: US 6,630,941 B1
(45) Date of Patent: Oct. 7, 2003

(54) SELF-SERVICE TERMINAL

(75) Inventor: Ian Addison, Fife (GB)

(73) Assignee: NCR Corporation, Dayton, OH (US)

(*) Notice: Subject to any disclaimer, the term of this patent is extended or adjusted under 35 U.S.C. 154(b) by 459 days.

(21) Appl. No.: 09/587,735

(22) Filed: Jun. 5, 2000

(30) Foreign Application Priority Data

Jun. 8, 1999 (GB) .............................. 9913159

(51) Int. Cl.$^7$ ................................. G09G 5/00
(52) U.S. Cl. .................... 345/702; 345/173; 705/43
(58) Field of Search ................... 345/701–702, 345/700, 764, 864–866, 961–962, 173, 172, 184; 705/43

(56) References Cited

U.S. PATENT DOCUMENTS

| 5,369,469 | A | * | 11/1994 | Leo et al. ................. 399/8 |
| 5,382,777 | A | | 1/1995 | Yuhara et al. |
| 5,743,799 | A | * | 4/1998 | Houriet et al. ............. 463/25 |
| 5,752,239 | A | * | 5/1998 | Coutts ...................... 705/26 |
| 5,786,811 | A | * | 7/1998 | Jaeger ...................... 345/172 |
| 5,897,625 | A | * | 4/1999 | Gustin et al. ............... 705/43 |
| 6,014,137 | A | * | 1/2000 | Burns ....................... 345/747 |
| 6,061,666 | A | * | 5/2000 | Do et al. ................... 705/43 |
| 6,081,791 | A | * | 6/2000 | Clark ....................... 705/43 |
| 6,085,177 | A | * | 7/2000 | Semple et al. .............. 705/43 |
| 6,199,754 | B1 | * | 3/2001 | Epstein .................... 235/379 |
| 6,326,956 | B1 | * | 12/2001 | Jaeger et al. ............... 345/179 |

FOREIGN PATENT DOCUMENTS

| EP | 0718813 | 6/1996 |
| WO | 9714118 | 4/1997 |
| WO | 9827533 | 6/1998 |

* cited by examiner

Primary Examiner—Sy D Luu
(74) Attorney, Agent, or Firm—Francis L. Conte

(57) ABSTRACT

A self-service terminal (SST) fascia (12) comprises a touch-sensitive display (14) capable of displaying a selection of images and at least one further user-interfacing element, such as a card reader slot (18) or a receipt printer slot (22), incorporated within the display (14) so that the display (14) surrounds the user-interfacing elements.

12 Claims, 2 Drawing Sheets

SELF-SERVICE TERMINAL

BACKGROUND OF THE INVENTION

This invention relates to a self-service terminal (SST), and in particular to a user interface for an SST.

Self-service terminals are widely used for executing tasks and transactions which do not require human supervision, such as providing information on locations of stores in a large mall, and the purchase of travel tickets, parking vouchers, postage and savings stamps and the like. Perhaps the most frequently encountered SSTs are automated teller machines (ATMs), which are used extensively to execute financial transactions such as cash withdrawals from bank accounts. A typical ATM is provided with a molded or cast fascia which accommodates a range of user-interfacing elements, most commonly a display, keypad, card reader slot and cash and receipt dispense slots.

The preferred ATM configuration varies widely depending on the preferences of the ATM provider, local banking customs and legislation, and of course the transactions which are to be available from the ATM. Accordingly, a typical ATM is constructed on a modular basis around a standard core, the different modules typically being sourced from outside suppliers, as is the fascia molding. Many of the modules, typically those comprising a combination of electronic and electromechanical parts, may be modified as required to meet particular customer requirements at relatively short notice. However, extended lead times are required to obtain modified fascias, and the expense involved in preparing the moulds and other tooling necessary to produce a fascia may make it uneconomic to produce limited runs of fascias in response to isolated customer requests.

SUMMARY OF THE INVENTION

It is among the objectives of embodiments of the present invention to obviate or mitigate these or other disadvantages.

According to the present invention there is provided a self-service terminal (SST) fascia comprising a touch-sensitive display, where the display incorporates at least one further user-interfacing element so that the at least one further user-interfacing element is surrounded by the display.

By virtue of this aspect of the invention, the display is able to display images around the perimeter of a user-interfacing element aperture, thereby attracting a user's attention to the aperture.

Also by virtue of this aspect of the invention, an SST may use a display instead of a fascia, as the display may incorporate all of the user-interfacing elements provided in a fascia.

In some embodiments, the display may be mounted directly onto an SST; in other embodiments, the display may be mounted on a screen so that the screen can be coupled directly to an SST.

The invention also relates to an SST incorporating such a fascia.

Embodiments of the invention simplify the production of the terminal fascia, as some or all of the user-interfacing elements may be incorporated in the display, which preferably has a substantially smooth planar surface and is therefore readily modified without requiring extensive retooling. For example, it may simply be necessary to machine apertures at different locations in the display. By providing some or all of the user-interfacing elements in the display, and by mounting the display either directly to the terminal or in a narrow ("picture") frame, the terminal may be relatively narrow.

The display may be rectangular or square, and if desired may be tall and narrow, or shallow and wide. Alternatively, the display may be "T" or "L"-shaped, or indeed of any desired shape or form.

Preferably, the display defines one or more apertures, typically slots, to accommodate at least one of a dispense slot, typically in combination with a receipt printer, and a card reader slot. The appropriate modules may sit behind the apertures, mounted on the terminal chassis or body.

The display is preferably an LCD or a light emitting polymer. Preferably, the display is operatively associated with a touch panel such that, for example, the display may selectively display, for example, a keyboard or other data entry image, and then display a different image, such as information for the user relating to available services, recent transactions, personal information, or advertising material. Most preferably, the display selectively provides guidance or information for the user in relation to their interaction with the terminal, for example highlighting the location of a card reader slot incorporated in the display, providing information on the preferred card orientation for insertion in the slot, or directing the user's attention to the location of a receipt or statement printer output slot. Accordingly, the user's sight is maintained on the display throughout the transaction.

The terminal may include biometric sensors for, for example, identifying or verifying the identity of a user. The sensor may detect a user's iris pattern, palm print or other biometric indicator. For iris pattern recognition, the terminal may include a camera, and this may be concealed behind a portion of the display; at the appropriate stage in a transaction the display may instruct the user to:

"Look here", and direct the user's eyes to the camera location.

The touch-sensitive display technology may be selected as appropriate to the intended application for the terminal, and may rely on resistive, infrared, capacitive or surface acoustical wave (SAW) technology.

The display may display images on its entire surface or only on a portion of its surface.

According to a further aspect of the present invention there is provided a method of producing a self-service terminal (SST) fascia, the method comprising: providing a touch-sensitive display; locating at least one user-interfacing element rearwardly of the display; and providing an opening in the display to permit physical communication between the element and a user.

According to a still further aspect of the present invention there is provided a method of interacting with the user of a self-service terminal, the method comprising the steps of: displaying user instructions on a touch-sensitive display; and configuring the display for operation in combination with at least one further user-interfacing element incorporated in the display.

According to another aspect of the invention there is provided a self-service terminal (SST) fascia comprising a display, where the display defines at least one aperture for interfacing with a user, so that the at least one aperture is surrounded by the display.

BRIEF DESCRIPTION OF THE DRAWINGS

These and other aspects of the present invention will now be described, by way of example, with reference to the accompanying drawings, in which.

DETAILED DESCRIPTION

Figure 1:
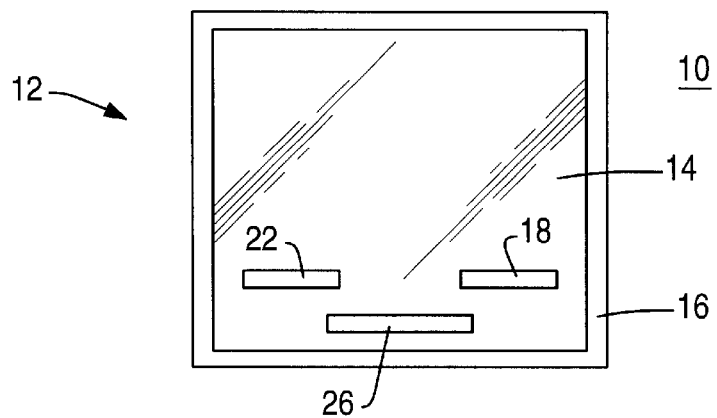
FIG. 1 is a schematic front elevation of the fascia of a self-service terminal (SST) in accordance with a preferred embodiment of the present invention.
Figure 2:
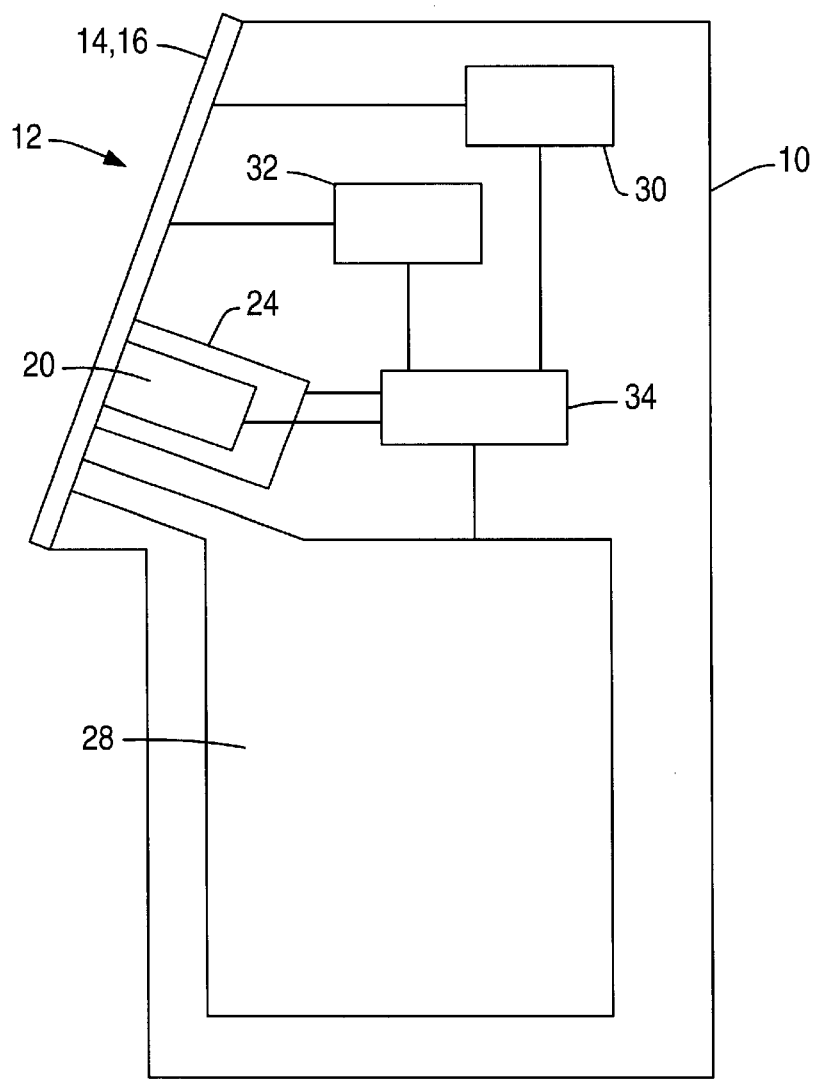
FIG. 2 is a schematic sectional view of the terminal of FIG. 1.

Referring to FIGS. 1 and 2, a self-service terminal (SST) 10 in the form of an automated teller machine (ATM) includes a fascia 12. The machine fascia 12 comprises an LCD touchscreen display 14 that is coupled to the ATM's chassis. A sealing strip in the form of a narrow frame 16 is mounted onto the perimeter of the display 14.

The touchscreen display 14 defines three apertures in the form of slots. One slot 18 is associated with a card reader module 20 located within the ATM 10 rearwardly of the display 14. A second slot 22 is associated with a receipt printer module 24 located within the ATM 10 rearwardly of the display 14. A third slot 26 is associated with a cash dispenser module 28 located in a safe (not shown) within the ATM 10.

A display driver 30 is used to control the display 14. The various modules and display are provided as sub assemblies and mounted at appropriate locations on a chassis or frame within the ATM 10.

The touch-sensitive display 14 enables a user to select an area on the display by pointing at the area using a probe, such as one of their fingers or a stylus. The X and Y coordinates of an area that is pointed at by a user is determined by an appropriate display monitor 32.

Unlike a conventional ATM, the card reader and receipt printer modules 24, 24 are located behind the display 14, and the associated slots 18, 22 are formed in the display 14 so that the display 14 can surround each slot 18, 22 with graphical or textual information. The machine 10 is otherwise conventional, including a main processor 34 for controlling the operation of the machine 10.

In use, appropriate user instructions, prompts, and information are featured on the display 14. For example, an initial display may highlight the card input slot 18, and include instructions and graphics as to the correct card orientation. Once a card has been inserted in the slot 18, the display 14 may then show an image of a keypad, and prompt the user to input their personal identification number (PIN). Operating in conjunction with the touch-sensitive display 14, the entered PIN will be utilized to confirm the user's identity. The display 14 may then show a number of discrete areas each representing an available transaction and invite the user to touch the area displaying their desired option. Operating in conjunction with the touch-sensitive display 14, the user's selection will then cause the machine to execute the desired transaction. While the transaction is being progressed within the machine 10, the display 14 may show any desired image, such as advertising material or information on other services available from the ATM provider. When the transaction has been completed within the machine 10, appropriate instructions and graphics may feature on the display 14, for example the user may be instructed to:

"Please take your cash which has been counted" and their attention directed to the cash dispense slot 26. The user may then be instructed to:

"Please take your card and receipt".

Again, the user's attention is drawn to the appropriate slot locations 18, 22 by graphics, which may be static or dynamic. The graphics may surround the slot locations to aid the user in locating the slots.

It will be apparent that the machine 10 has improved usability when compared to conventional ATMs, as the user's attention is maintained on the display 14, and the user does not have to search for the correct slot to, for example, insert their card or collect their receipt. The fascia configuration also offers significant advantages to SST manufacturers and facilitates production of machines in response to specific customer requirements. The shape or form of the display may be selected to suit a particular customer requirement; the display may be tall and narrow, wide and shallow, or even "T" or "L" shaped, and oval or circular if desired. The use of a touch-sensitive display facilitates provision of some or all of the user-interfacing elements within the display and thus facilitates production of machines in different formats. For example, an ATM provider may wish to incorporate ATM fascias in a distinctive "shop front", and the shape and size of the display may be selected to suit their particular requirements. The display material may be cut without difficulty in accordance with a template, and there is no requirement to provide or modify a conventional molded or cast fascia.

The provision of some or all of the user-interfacing elements in the display also reduces or obviates the need to provide media entry indicators (MEIs), typically flashing lights, or labels to draw the user's attention to the appropriate slots; as described above, the display 14 may include instructions and graphics which direct the user's attention to the appropriate slot when required.

The provision of some of the user-interfacing elements behind the display allows the modules to be accessed through the display.

Figure 3:
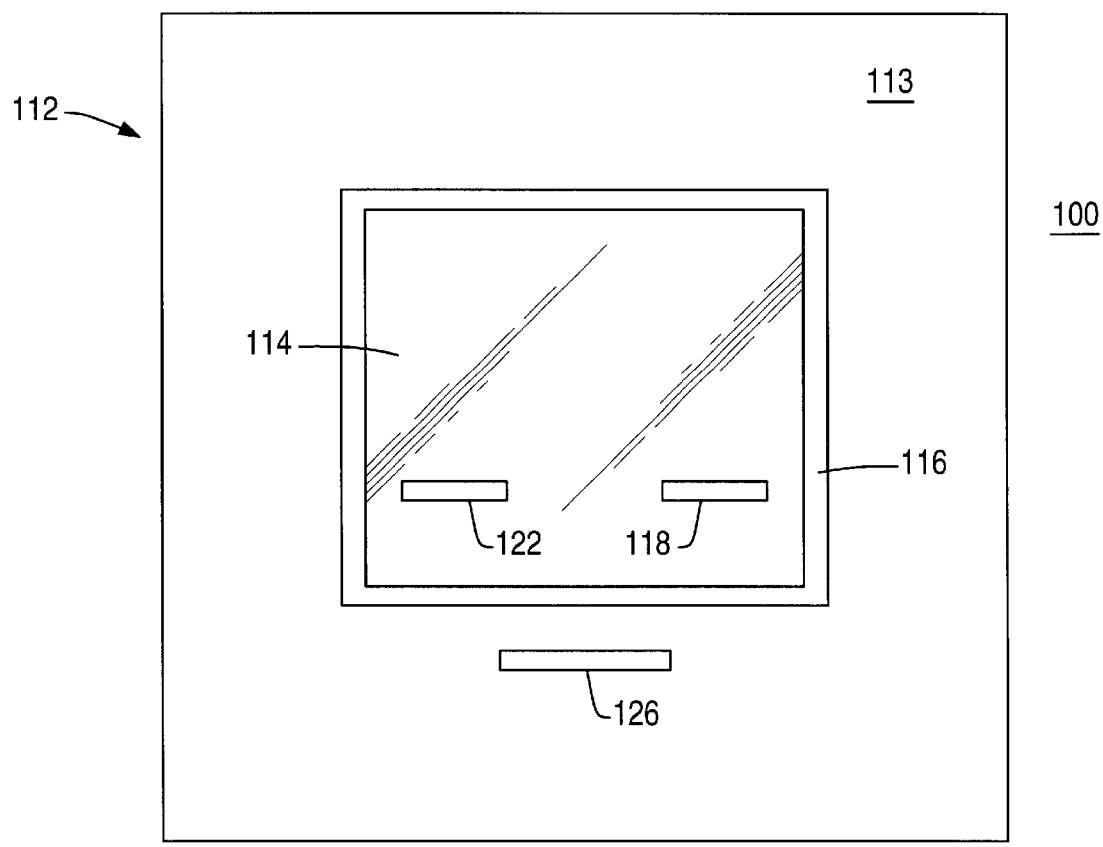
FIG. 3 is a schematic front elevation of the fascia of a self-service terminal (SST) in accordance with an alternative embodiment of the present invention.

Referring now to FIG. 3, which shows an alternative embodiment of the invention, an SST 100 in the form of an ATM includes a fascia 112 having a plastics screen 113 supporting a display 114. A sealing strip 116 in the form of a narrow frame is mounted onto the perimeter of the display 114. A card reader slot 118 and a receipt printer slot 122 are defined by the display 114, and a cash dispense slot 126 is defined by the screen 113. The modules that are associated with these slots, and the operation of the ATM 100, are identical to the embodiment described with reference to FIGS. 1 and 2.

It will be apparent to those of skill in the art that the above-described machine is merely exemplary of the present invention and that various modifications and improvements may be made thereto without departing from the present invention. For example, the invention may be embodied in SSTs other than ATMs. In other embodiments, the display may be a light emitting polymer, a plasma panel, or other any other suitable display. In other embodiments, the display may not be a touchscreen display: a keypad or some other means for entering information may be used. The keypad may be incorporated in an aperture in the display.

What is claimed is:

1. An automated teller machine comprising:
    a touch-sensitive display;
    a first user-interfacing element in the form of a cash dispenser located rearwardly of the display; and
    means defining a first opening in the display to permit physical communication between a user and the cash dispenser.

2. An automated teller machine according to claim 1, further comprising a second user-interfacing element located rearwardly of the display.

3. An automated teller machine according to claim 2, wherein the second user-interfacing element includes one of a printer and a card reader.

4. An automated teller machine according to claim 1, further comprising means defining a second opening in the display to allow physical communication between a user and the second user-interfacing element.

5. An automated teller machine according to claim 4,
wherein the first and second user-interface elements are modular sub-assemblies mounted on a chassis behind the display.

6. A self-service terminal fascia comprising:
a touch-sensitive display incorporating at least one user-interfacing element such that the at least one user-interfacing element is surrounded by the display, the display defining at least one aperture, the at least one aperture being operatively associated with at least one of a printer, a card reader, and a cash dispenser.

7. A self-service terminal comprising:
a touch-sensitive display;
at least one user-interfacing element located rearwardly of the display, the at least one user-interfacing element including one of a printer, a card reader, and a cash dispenser; and
means defining an opening in the display to permit physical communication between the element and a user.

8. A self-service terminal comprising:
a touch-sensitive display;
a first user-interfacing element located rearwardly of the display;
a second user-interfacing element located rearwardly of the display;
one of the first and second user-interfacing elements including one of a printer, a card reader, and a cash dispenser; and
means defining a number of openings in the display to permit physical communication between a user and the first and second user-interfacing elements.

9. A self-service terminal fascia comprising:
a display panel including an aperture therein, said display panel being configured for being touch-sensitive for receiving user instructions by touching thereof,
a display driver operatively joined to said display for selectively displaying herein changing images around said aperture; and
a user-interface module mounted behind said panel at said aperture for access by said user therethrough, said module comprising a card reader.

10. A self-service terminal fascia comprising:
a display panel including an aperture therein, said display panel being configured for being touch-sensitive for receiving user instructions by touching thereof;
a display driver operatively joined to said display for selectively displaying therein changing images around said aperture;
a user-interface module mounted behind said panel at said aperture for access by said user therethrough, said module comprising a receipt printer.

11. A self-service terminal fascia comprising:
a display panel including an aperture therein, said display panel being configured for being touch-sensitive for receiving user instructions by touching thereof,
a display driver operatively joined to said display for selectively displaying therein changing images around said aperture; and
a user-interface module mounted behind said panel at said aperture for access by said user therethrough, said module comprising a cash dispenser.

12. A self-service terminal fascia comprising:
a display panel including an aperture therein, said display panel being configured for being touch-sensitive for receiving user instructions by touching thereof;
a display driver operatively joined to said display for selectively displaying therein changing images around said aperture;
a user-interface module mounted behind said panel at said aperture for access by said user therethrough; and
a processor operatively joined to said display driver and configured for displaying on said panel a series of prompts for response by said user in execution of an automated teller financial transaction.

* * * * *

UNITED STATES PATENT AND TRADEMARK OFFICE
CERTIFICATE OF CORRECTION

PATENT NO. : 6,630,941 B1
DATED : October 7, 2003
INVENTOR(S) : Addison, I.

It is certified that error appears in the above-identified patent and that said Letters Patent is hereby corrected as shown below:

<u>Column 6,</u>
Line 2, delete "herein" and insert -- therein --.

Signed and Sealed this

Sixteenth Day of March, 2004

JON W. DUDAS
*Acting Director of the United States Patent and Trademark Office*